(12) United States Patent
Bartley

(10) Patent No.: US 6,928,585 B2
(45) Date of Patent: Aug. 9, 2005

(54) METHOD FOR MUTUAL COMPUTER PROCESS MONITORING AND RESTART

(75) Inventor: Timothy Simon Bartley, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 09/864,118

(22) Filed: May 24, 2001

(65) Prior Publication Data

US 2002/0184295 A1 Dec. 5, 2002

(51) Int. Cl.[7] .................................................. G06F 11/30
(52) U.S. Cl. .............................. 714/23; 714/25; 714/38; 714/48
(58) Field of Search ............................ 714/23, 25, 38, 714/48

(56) References Cited

U.S. PATENT DOCUMENTS

| | | | | |
|---|---|---|---|---|
| 5,377,322 | A | 12/1994 | Ogura et al. ................. | 395/200 |
| 5,590,277 | A | 12/1996 | Fuchs et al. ........... | 395/183.14 |
| 5,748,882 | A | 5/1998 | Huang .................... | 395/184.01 |
| 5,914,539 | A | 6/1999 | Borgmann et al. ............ | 307/38 |
| 5,978,933 | A | 11/1999 | Wyld et al. .................... | 714/13 |
| 6,687,847 | B1 * | 2/2004 | Aguilera et al. .............. | 714/23 |
| 6,745,350 | B1 * | 6/2004 | Cline et al. ................... | 714/38 |
| 2002/0152425 | A1 * | 10/2002 | Chaiken et al. ............... | 714/23 |

FOREIGN PATENT DOCUMENTS

| | | | | |
|---|---|---|---|---|
| JP | 58097751 A | 6/1983 | ........... | G06F/11/20 |
| JP | 2182054 A | 7/1990 | ........... | H04L/12/42 |
| JP | 4268929 A | 9/1992 | ........... | G06F/11/20 |
| JP | 8314875 A | 11/1996 | ........... | G06F/15/16 |

* cited by examiner

Primary Examiner—Bryce P. Bonzo
Assistant Examiner—Joseph Manoskey
(74) Attorney, Agent, or Firm—Duke W. Yee; Jeffrey S. LaBaw; Peter B. Manzo (57) ABSTRACT

The present invention provides a method for detecting a termination of a process within a plurality of processes in a data processing system. A monitoring policy is established, within the plurality of processes, wherein the monitoring policy assigns a first process within the plurality of processes to monitor a second process within the plurality of processes. Responsive to a termination of execution of the second process, a cause of the execution termination is determined by the first process. Responsive to a determination that the second process terminated execution in an abnormal manner, the first process attempts to restart the second process. Furthermore, the present invention provides a method for inserting a process within a plurality of processes containing a first process and a monitoring policy in a data processing system. A request is received from a second process to join the plurality of processes. Responsive to the second process joining the plurality of processes, the first process within the plurality of processes is selected to monitor the second process. The monitoring policy is modified, wherein the monitoring policy assigns the selected first process to monitor the second process for termination of execution.

44 Claims, 6 Drawing Sheets

| INTERFACE | PARAMETER |
|---|---|
| 402 — oss_watch_start | oss_watch_id_t — 406 |
|  | error_status_t*status — 408 |
| 404 — oss_watch_stop | error_status_t*status — 410 |

METHOD FOR MUTUAL COMPUTER PROCESS MONITORING AND RESTART

BACKGROUND OF THE INVENTION

1. Technical Field

The present invention relates to an improved data processing system and, in particular, to a method and system for data processing system reliability.

2. Description of Related Art

A computer includes both a physical machine, namely the hardware, and the instructions which cause the physical machine to operate, namely the software. Software includes both application and operating system processes. If the process is simply to do tasks for a user, such as solving specific problems, it is referred to as application software. If a process controls the hardware of the computer and the execution of the application processes, it is called operating system software. System software further includes the operating system, the process that controls the actual computer or central processing unit (CPU), and device drivers that control the input and output devices (I/O) such as printers and terminals.

A number of application processes are usually present waiting to use the CPU. The operating system determines which process will run next, how much of the CPU time it will be allowed to use, and what other computer resources the application will be allowed to access and use. Further, each application process will require a special input or output device and the application process must transfer its data to the operating system, which controls the device drivers.

However, frequently these processes fail. When such a failure does occur, either the task, in the case of an application process, or the computer system, in the case of an operating system, will terminate operation. There is presently no mechanism for one computer process monitoring another process to detect when such a failure occurs. This restart capability currently must be performed by a variety of processes. At present, there is no mechanism for providing an automatic restart capability to ensure any processes experiencing software failure can be automatically restarted on such a failure. Furthermore, there is no mechanism which provides for a process to be enabled or disabled during the normal operation of the operating system.

Therefore, it would be advantageous to have a method to have mutual computer process monitoring and restart. There needs to be a process within a set of processes which monitors another process within the set of processes. Several cooperating computer processes ensure robustness in the event that one of the processes terminates abnormally.

SUMMARY OF THE INVENTION

The present invention provides a method for detecting a termination of a process within a plurality of processes in a data processing system. A monitoring policy is established, within the plurality of processes, wherein the monitoring policy assigns a first process within the plurality of processes to monitor a second process within the plurality of processes. Responsive to a termination of execution of the second process, a cause of the execution termination is determined by the first process. Responsive to a determination that the second process terminated execution in an abnormal manner, the first process attempts to restart the second process.

Furthermore, the present invention provides a method for inserting a process within a plurality of processes containing a first process and a monitoring policy in a data processing system. A request is received from a second process to join the plurality of processes. Responsive to the second process joining the plurality of processes, the first process within the plurality of processes is selected to monitor the second process. The monitoring policy is modified, wherein the monitoring policy assigns the selected first process to monitor the second process for termination of execution.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
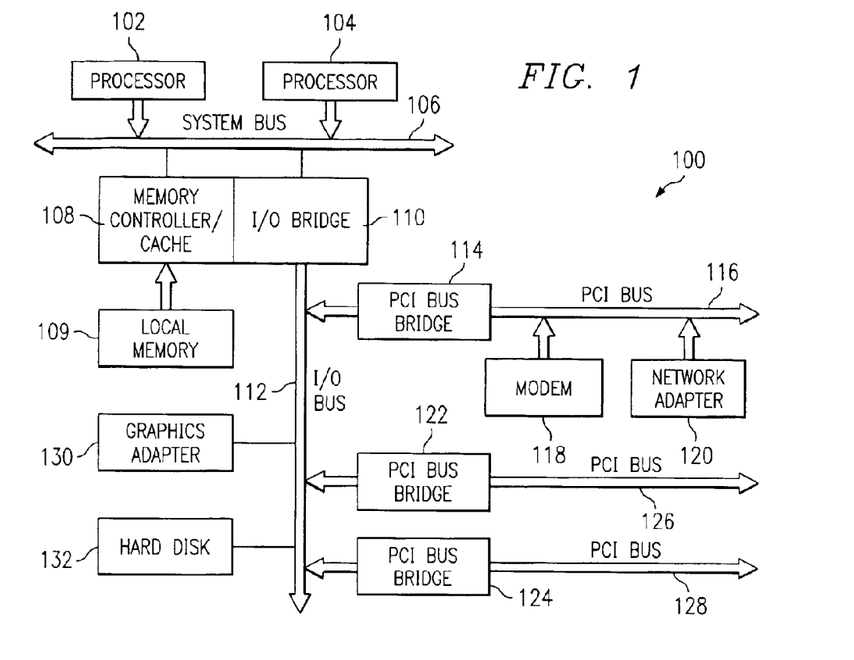
FIG. 1 is a block diagram of a data processing system that may be implemented as a server in accordance with a preferred embodiment of the present invention.

With reference now to the figures, FIG. 1 is a block diagram of a data processing system that may be implemented in accordance with a preferred embodiment of the present invention. FIG. 1 may be implemented as a server. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI bus 116. Typical PCI bus implementations will support four PCI expansion slots or add-in connectors.

Additional PCI bus bridges 122 and 124 provide interfaces for additional PCI buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

Figure 2:
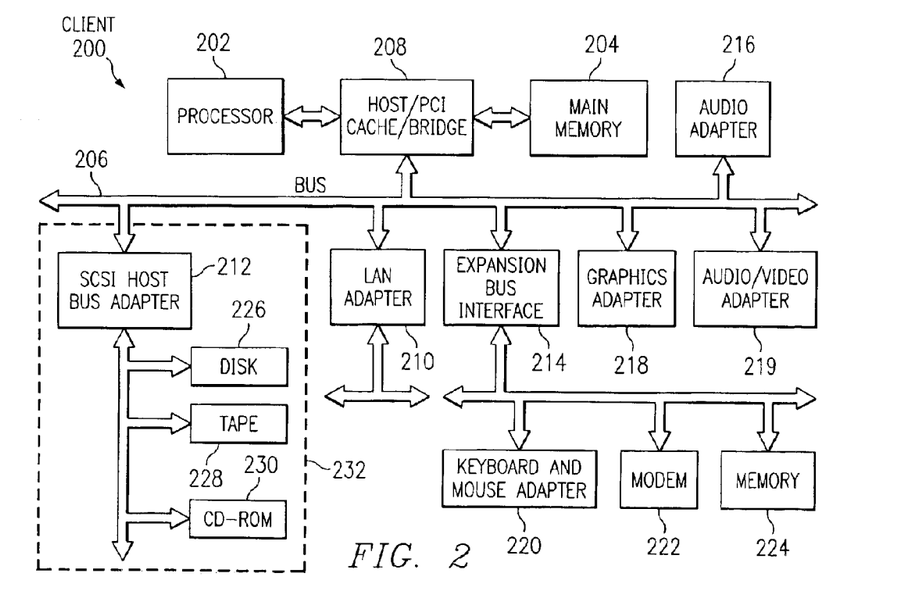
FIG. 2 is a block diagram illustrating a data processing system in which the present invention may be implemented.

FIG. 2 is a block diagram illustrating a data processing system in which the present invention may be implemented. Data processing system 200 is an example of a client computer. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The present invention provides a method and system for a system to monitor several cooperating computer processes ensuring robustness in the event that one of the processes terminates abnormally. An automatic restart of any failed processes is provided. The automatic restart feature activates without attaching any special significance to any one process within the several cooperating computer processes. For example, there is no single "monitor" process allowing any of the processes in a "watchdog" set to be shutdown and restarted cleanly. In other words, none of the monitored processes may have any special significance. In particular, there may be no master process that needs to be running in order to monitor the processes. Such a master process may need to be protected from abnormal termination by some other means than participation in the "watchdog set", such as, for example, a set of monitored processes. Automatic restart of a failed process may not be triggered, however, when a process in the watchdog set terminates normally. A normal process termination may not trigger an automatic restart.

Each process may participate in the watchdog set. Each process monitors, for example, one other process in a ring. When a new process joins the watchdog set, the new process inserts itself into the ring of processes. When a process terminates normally, that process removes itself from the ring. The insertion process may occur by means of each existing process in the watchdog set monitoring an inter-process communication (IPC) mechanism for requests to join the watchdog set.

Each process in the watchdog set may contain an associated file that contains, for example, two pieces of information such as the process' state and a monitored process which the process should be monitoring. Each monitored process may also have a first-in first out (FIFO) communications link which is used by the monitoring process to detect when the monitored process terminates. An important attribute of the IPC mechanism may be the monitoring process may use the IPC mechanism to detect when the monitored process terminates either normally or abnormally. A UNIX FIFO may be an example of one such suitable mechanism.

When a monitored process is running normally, the monitored process may operate with the FIFO communications link open for a write operation. The process for monitoring a process may be to post a blocking read on the monitored process' FIFO communications link. A "blocking read" refers to a read I/O operation on the FIFO that causes the thread of execution in the monitoring process that posts the blocking read to pause until, for example, one of two situations occur. These situations may be, for example, data is available to be read from the FIFO or the process at the other end of the FIFO closes its end of the FIFO. It may be the second of these cases that is used to determine that the monitoring process has terminated. In such a situation, the FIFO may be closed on process termination in a manner that is detectable by the monitoring process independently of how the monitored process terminates. This happens, far example, because on abnormal termination, the operating system itself, for example, UNIX, will ensure that the monitored process' end of the FIFO is closed. There may be no actual data transmission occurring between the two processes across the FIFO link. It may be the closing of the channel that is used to determine that the monitored process has terminated.

If the blocking read returns the monitoring process can determine that the monitored process has terminated when no data is available to be read from the FIFO. When a process terminates normally, the process writes into its state file that the process is terminating. When a process terminates abnormally, such state is not written into its state file. This is the key in which the process of the present invention determines whether or not to restart the monitored process.

Figure 3A:
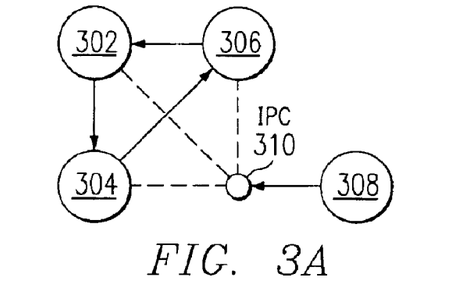
FIGS. 3A and 3B are exemplary block diagrams illustrating the addition of a new process into an existing process ring in accordance with a preferred embodiment of the present invention.
Figure 3B:
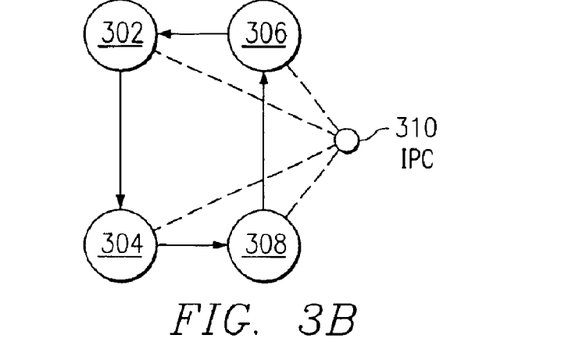

FIGS. 3A and 3B is an exemplary block diagram illustrating the addition of a new process into an existing process ring in accordance with a preferred embodiment of the present invention. Each process may participate in the watchdog set. Each process monitors, for example, one other process in a ring. When a new process joins the watchdog set, the new process inserts itself into the ring of processes. When a process terminates normally, that process removes itself from the ring. The insertion process may occur by means of each existing process in the watchdog set monitoring an inter-process communication (IPC) mechanism for requests to join the watchdog set. One of the existing processes in the ring, which may be, for example, chosen at random receives the request for the new process to join the ring. The new process is then inserted into the ring and the randomly chosen existing process adopts the new process and monitors the new process. The randomly chosen existing process also may instruct the new process to monitor the current monitored process.

When running normally, a process may hold open a FIFO communications link specific to that particular process. This FIFO communications link is called the "monitored FIFO" for the particular process. The monitoring process has a thread that is blocked when attempting to read the monitored process' monitored FIFO. The monitored process may never write anything to the monitored FIFO. If the blocking read on the FIFO ever completes, the monitored process must have terminated.

There may be two sets of IPC channels used by the monitoring system. One for the mutual monitoring and the other used to handle requests to join the watchdog set. In the implementation, for example, a UNIX FIFO may be chosen for both of these IPC channels. A "thread" is a thread of execution within a process. A thread shares a process' memory with other threads within the process but maintains its own execution context. Threads allow the "blocking read" to be posted without causing the entire process to pause until the read completes. Only the thread that posts the blocking read will wait.

In FIG. 3A, process 302, process 304 and process 366 form a process ring known as the watchdog set. Process 302 monitors process 304, process 304 monitors process 306 and process 306 monitors process 302. Each process 302–306, monitors .IPC 310 when a new process, such as, process 308, requests to join the watchdog set. IPC 310 is the gateway in which a new process joins the ring. The IPC channel is monitored by all processes within the watchdog set. This ensures that no one process Is considered the "master" monitor, for example, the process to which join requests would otherwise need to be sent. When a process requests to join the watchdog set, it sends a message on this IPC channel. Any of the processes monitoring this IPC channel may read this message (typically chosen at random by the operating system). Therefore, it may be essential that the message be able to be read atomically, i.e., in a single operation, so the message does not get split into pans and removing the possibility that the monitoring processes could sec fragmented messages. This is achieved in the example implementation by choosing messages one (1) byte in length. Process 308 requests, through IPC 310 to join the watchdog set.

In FIG. 3B, process 308 is allowed to join the watchdog set. Process 304 is randomly chosen as the monitor for process 308. Process 308 now monitors process 306 which was previously monitored by process 304 in FIG. 3A. In addition, process 308 also begins monitoring IPC 310 for requests for additional processes to join the watchdog set.

If any processes, for example, processes 302–308 in FIG. 3B, terminate abnormally, the monitoring process will restart the terminated process. If more than one process terminates abnormally, then the remaining processes will cause all abnormally terminated processed to restart. For example, in FIG. 3B, should processes 306 and 308 terminate abnormally simultaneously, then process 304 will restart process 308, and once restarted, process 308 will restart process 306. After being restarted process 306 will reestablish itself as the monitor for process 302.

The ability to restart multiple simultaneously failed processes may be supported by a persistent storage of a monitor state on a per-process basis. Each process may record in the persistent storage, its current state and the identity of the process it is monitoring. The state information may also be used by the monitoring process to determine whether the termination of a process was either normal or abnormal.

The monitoring process may be any connection oriented mechanism that is provided by an operating system. The connection oriented mechanism provided by the operating system may require a reliable notification by the operating system of the abnormal termination of a process being monitored. Potential reliable notification systems may include, for example, a TCP/IP connection where termination of the monitored process results in the operating system notifying the monitoring process that the TCP/IP connection has been terminated. In addition, the operating system may notify a reliable first-in first-out (FIFO) communication system between processes, such as, for example, a pipe, where an outstanding blocking read by the monitoring process may terminate in failure if the monitored process disconnects from the other end of the FIFO communication system, for example, the other end of the pipe.

The state file, as previously described, may be maintained for each monitored program containing state information.

The state file may contain information required to determine whether or not the monitored process terminated normally or abnormally. There may be, for example, four possible states that may be recorded in the state file. For example, a running state, a shutdown state, a privileged start state, and a privileged restart state may be written into the state file. The privileged start state and the privileged restart state may indicate that the process has been invoked in a manner that will inherit some characteristic. A characteristic may be a security privilege that may only, for example, be gained by a process by being the first process to require such a privilege or by inheritance from a process that already has the privilege. Processes may have a parent/child relationship and a process' parent may be the process that started the process in question. A process may have only one parent but many children.

In one possible situation, the processes being monitored all may have a special security privilege. The processes in the watchdog set all may have special privileges within this enhanced security system. This special privilege may have the described property and may only be obtained in, for example, one of two ways. First, the process may have a system privilege and no other processes have the special privilege. Second, the process may be started by another process that already has the special privilege.

The privileged start state may indicate that the process should itself attempt to start another process from the watchdog set and monitor the other process. The privileged restart state may indicate that the process should start itself and start monitoring the process as indicated in its state file. If the monitored process terminates abnormally, the monitoring process restarts the monitored process. The pseudo-code for this restart function may be expressed as follows:

```
for ever
do
   blocking read monitored process' FIFO
   lock monitored process' state file
   read monitored process' state file
   if state is "running"
      //monitored process terminated abnormally
      fork and execute abnormally executed program
      wait for child to open monitored FIFO
   else
      //monitored process terminated normally
      change monitored process to the process that the normally
         terminated process was monitoring
      write this change into monitoring process state file
   endif
endfor
```

When a process is restarted by running, for example, a process may require an inheritable privilege. The process may lock its state file and read from the state file the state it needs to determine how the process is being restarted. The process may perform this function according to an algorithm which may be expressed as follows:

```
blocking lock monitoring process state file
read monitoring process state file
if state is "privileged restart"
   //monitoring process is being restarted after abnormal
      termination
   start monitoring thread for monitored process which
      monitoring process is monitoring as recorded in state
      file
else
   //see below
endif
```

In order to satisfy requirements that, when started, if any other, for example, processes participating in the watchdog set are also running, then a new process may be invoked as a child of one of the running processes. The new process may inherit a privilege from the running processes by means of instructing one of the running privileged processes to restart the new process as a child.

This mechanism may be provided as a FIFO, called the join FIFO. Each running privileged process may have a thread reading from the join FIFO, called the join thread. On start up, for example, such a privileged process may open the join FIFO for a write operation in a non-blocking mode. If the open operation succeeds, this may indicate that there is at least one reader process, i.e., at least one such privileged process.

In such a case, the process may send a request that it be started. Another process' reader threads may receive the request and start the new process in a way that may indicate that the new process should watch the monitored process the receiving process was monitoring. The receiving process may then start monitoring the new process. The join thread behavior may be expressed as follows:

```
blocking open join FIFO read/write
if join FIFO locked, unlock join FIFO
for ever
   read start request from the join FIFO
   write lock the new process' state file
   write my monitored process' identification into the new
      process' state file
   unlock the process' state file
   start monitoring the new process and indicating that the
      monitoring process already holds a lock on the new
      process' state file
endfor
```

If a process is attempting to start and the process is unsuccessful in opening a join FIFO communications link for a write operation, the process attempting to start is a first privileged process to start since there may be no reading processes. This resolves a possible race condition if multiple privileged process daemons are attempting to start concurrently. The join FIFO communications link may have a lock file in addition which may be used to serialize initial open attempts by various processes. The pseudo-code for this start function may be expressed as follows:

```
lock process state file
read process state file
set process state as running
unlock process state file
if read state is "privilege start" or is "privilege restart"
   //process has been executed by a privilege process so the
      process can run
   if read state is "privilege start"
      for each monitored process
         non-blocking read-only open the monitored process
            FIFO
```

```
            if open would block
                lock process state file
                set process state file
                set process state file to "privilege start"
                set process monitoring program to monitoring
                    process
                start monitoring process for this process
                break for
            else
                close FIFO
            endif
        else
        if no open processes will block
            //all processes are running-this process is the
                last to start
            start monitoring monitored process
        endif
    else
        //state is "privilege restart"
        start monitoring read monitored process
        endif
        start join thread
    else
        blocking lock join FIFO lock file
        non-blocking open join FIFO write only
        if open succeeds
            //process is not the first to start so send a start
                request
            write start request to pipe
            close join FIFO
            terminate
        else
            //process is the first process to start
            start join thread indicating join lock is held
            for each watchable process
                non-blocking read-only open process FIFO
                if open would block
                    lock process state file
                    set process state file to "privilege start"
                    set watched process to process
                    start watching process
                    break
                else
                    close FIFO
                endif
            endfor
        endfor
    endfor
```

In addition, there may be an general task that may occur in, for example, two points called the "start watching" process. The "start watching" process may expand to including the monitoring of a process' termination as described above. The pseudo-code which may describe the behavior of the thread that performs the watching task may be expressed as follows:

```
for ever
    if monitored process is not running
        assert monitoring process owns lock on
            monitored process' state file
        fork and execute program
        unlock monitored process' state file
    endif
    blocking read monitored process' FIFO
    lock monitored process' state file
    if monitored process terminated normally
        read monitored process' monitored process
        set process' monitored process to be monitored process'
            monitored process
        assume new process is running
        unlock old monitored process' state file
    else
        // do not unlock monitored process' state file
```

```
    endif
end for
```

Figure 4:
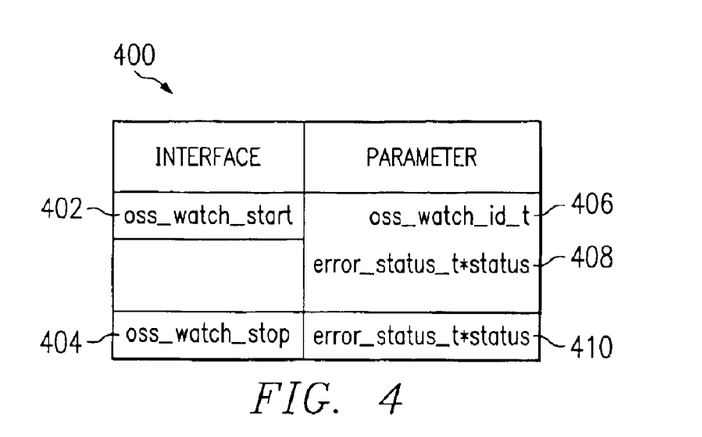
FIG. 4 is exemplary interfaces provided by a library for the purposes of implementing processes that are to participate in the watchdog set in accordance with a preferred embodiment of the present invention.

FIG. 4 is exemplary interfaces provided by a library for the purposes of implementing processes that are to participate in the watchdog set in accordance with a preferred embodiment of the present invention. The library may be an internal component of a policy director for an operating system. In this example, library 400 may contain interfaces and associated parameters. An interface may include oss__watch__start 402 and oss__watch__stop 404. Oss__watch__start 402 may be a routine to join in the watchdog circle. Oss__watch__start 402 may be initiated early in a new process' life. Initiating oss__watch__start 402 may result in other process being started. Oss__watch__id__t 406 may be an identification indicating which process is attempting to join the watchdog circle. Error__status__t* status 408 may indicate a return status indicating success or failure of the operation. If error__status__t* status 408 value is error__status__ok, then the process has successfully joined the watchdog set. If error__status__t* status 408 value is owd__s__start__requested, then a process already in the watchdog set is starting the join process because the join process requires a privilege, i.e., this process issued a join request and a process already in the watchdog set is handling the join request. In such a case, a request may be sent to one of the running processes to start this new process with a privileged start. The requesting process may now wait until a determination is made that the start of the new process has been successful before reporting a successful startup to a user.

Oss__watch__stop 404 may indicate that a process has normally terminated and left the watchdog set. If a normal termination has been completed this may be indicated by error__status__t* status 410 signaling a routine completion status and error__status__ok indicating that the process has successfully left the watchdog set.

Figure 5:
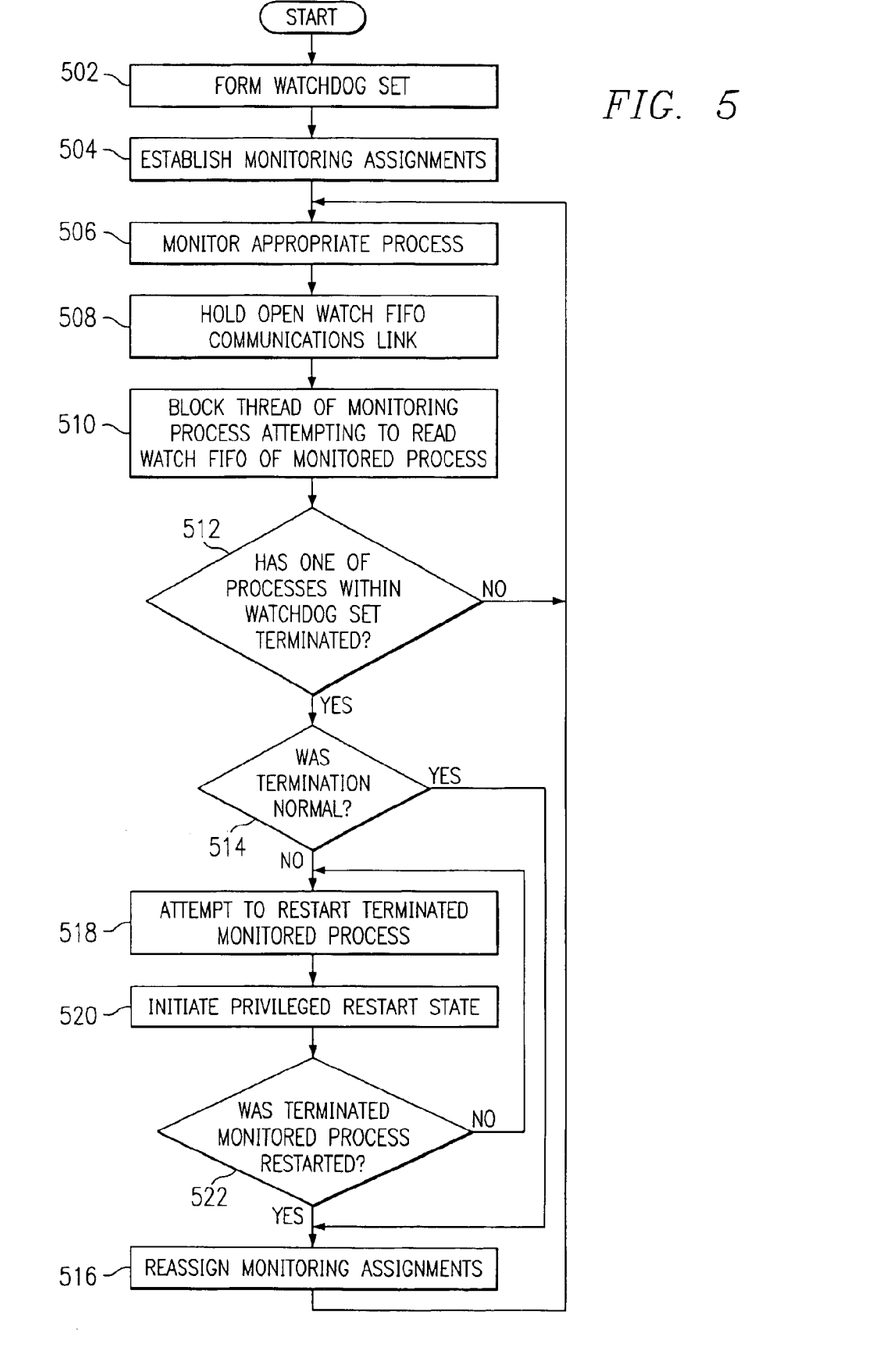
FIG. 5 is an exemplary flowchart illustrating a method for mutual computer process monitoring and restart in accordance with a preferred embodiment of the present invention.

FIG. 5 is an exemplary flowchart illustrating a method for mutual computer process monitoring and restart in accordance with a preferred embodiment of the present invention. In this example, the operation begins by forming a watchdog set (step 502). Then monitoring assignments are established between the process members of the watchdog set (step 504). Each process member monitors its appropriate fellow process member of the watchdog set (step 506). A watch FIFO communications link is held open (step 508). A thread of the monitoring process attempting to read the watch FIFO of the monitored process is blocked (step 510). Then a determination is made as to whether or not one of the processes within the watchdog set has terminated (step 512). If one of the processes within the watchdog set has not terminated (step 512:NO), then the operation returns to step 506 in which each process member monitors its appropriate fellow process member in the watchdog set. If one of the processes within the watchdog set has terminated (step 512:YES), then a determination is made as to whether or not the termination of the process was a normal termination. If the termination of the process was a normal termination (step 514:YES), then a reassignment of monitoring assignments is initiated within the remaining members of the watchdog group (step 516) and thereafter the operation returns to step 506 in which the appropriate process is monitored.

If the termination of the process within the watchdog set was not a normal termination (step 514:NO), an attempt is made to restart the terminated monitored process (step 518).

Then a privileged restart state is initiated (step 520). A determination is then made as to whether or not the terminated monitored process was restarted (step 522). If the terminated monitored process was not restarted (step 522:NO), the operation returns to step 518 in which an attempt is made to restart the terminated monitored process. If the terminated monitored process was restarted (step 522:YES), the operation returns to step 516 in which monitoring assignments are reassigned.

Figure 6A:
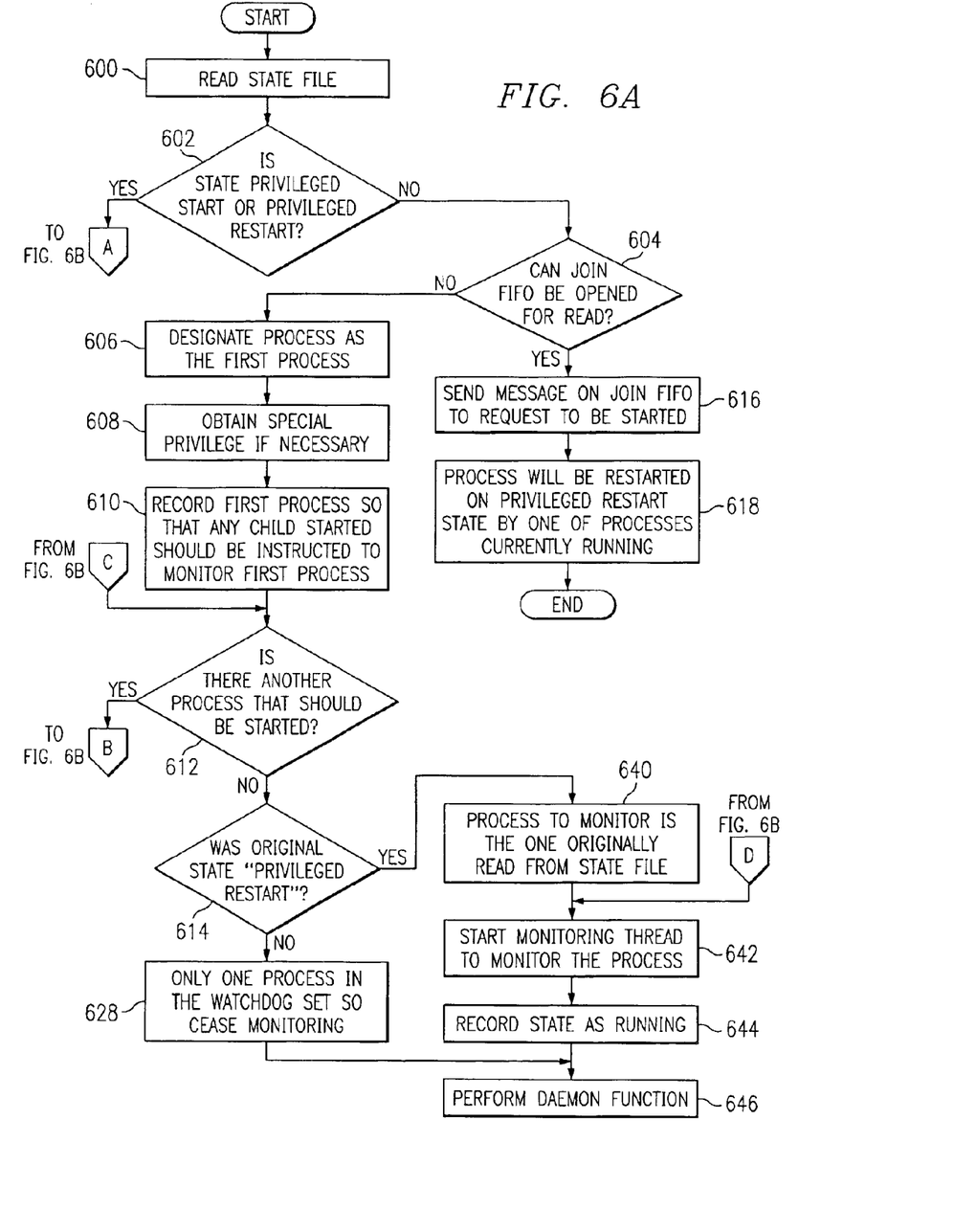
FIG. 6 is an exemplary flowchart illustrating the initialization of processes that will participate in the watchdog set in accordance with a preferred embodiment of the present invention.
Figure 6B:
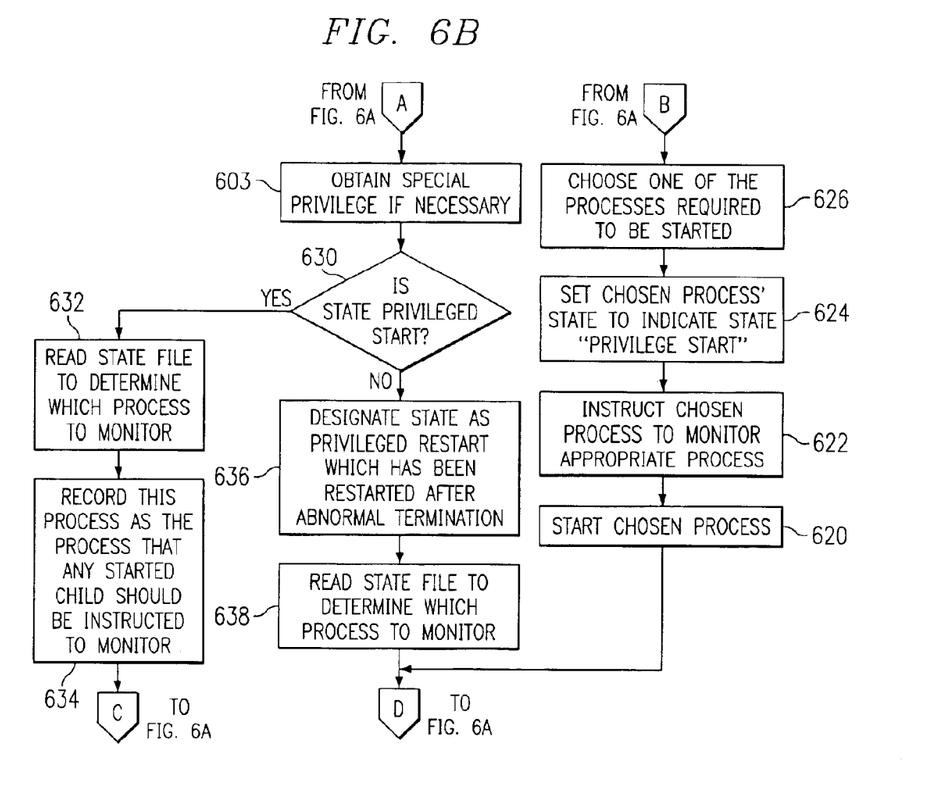

FIG. 6 is an exemplary flowchart illustrating the initialization of processes that will participate in the watchdog set in accordance with a preferred embodiment of the present invention. In this example, the operation starts by reading the state file (step 600) and determining as to whether or not the state is a privileged start or a privileged restart (step 602). If the state is not a privileged start nor a privileged restart (step 602:NO), then a determination is made as to whether or not a join FIFO can be opened or read (step 604). If the join FIFO can be opened or read (step 604:YES), then a message is sent on the join FIFO request to be started (step 616). The process will then be restarted on a privileged restart state by one of the processes currently running (step 618) and thereafter the operation terminates. If the join FIFO cannot be opened or read (step 604:NO), a process is designated as the first process (step 606). A special privilege is obtained if necessary (step 608). The first process is recorded so that any child started should be instructed to monitor the first process (step 610). Then a determination is made as to whether or not there is another process that should be started (step 612). If there is another process that should be started (step 612:YES), one of the processes required to be started are chosen (step 626). The chosen process' state is set to indicate a "privilege start" state (step 624). The chosen process is instructed to monitor the appropriate process (step 622). The chosen process is started (step 620) and the operation continues to step 642 in which a monitoring thread is started to monitor the process.

Returning to step 612, if there is not another process that should be started (step 612:NO), a determination is then made as to whether or not an original state of the process was a "privileged state" (step 614). If the original state was not a "privileged restart" (step 614:NO), only one process is in the watchdog set so monitoring is ceased (step 628) and thereafter a daemon function is performed (step 646). If the original state of the process was a "privileged restart" (step 614:YES), the process to monitor is the one originally read from the state file (step 640). A monitoring thread is started to monitor the process (step 642). The state is then recorded as running (step 644) and thereafter a daemon function is performed (step 646).

Returning to step 602, if the state is a privileged start or a privileged restart (step 602:YES), then a special privilege is obtained if necessary (step 603). Then a determination is made as to whether or not the state is a privileged start (step 630). If the state is not a privileged restart (step 630:NO), the state file is read to determine which process to monitor (step 632). The process is then recorded as the process that any started child should be instructed to monitor (step 634) and the operation continues to step 612 in which a determination is made as to whether or not there is another process that should be started.

Returning to step 630, if the state is not a privileged start (step 630:NO), the state is designated as a privileged restart which has been restarted after an abnormal termination (step 636). The state file is then read to determine which process to monitor (step 638). The monitoring thread is then started to monitor the process (step 642). The state is then recorded as running (step 644) and thereafter the daemon function is performed (step 646).

Figure 7:
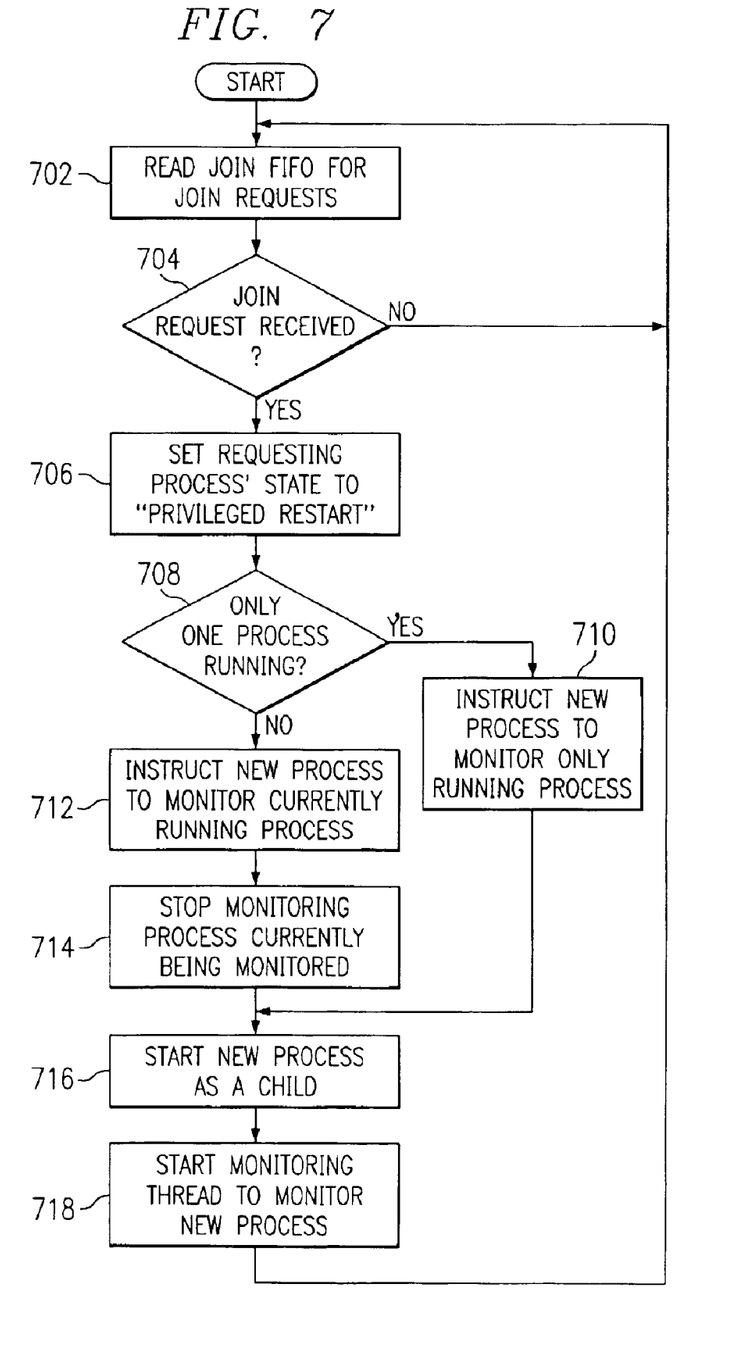
FIG. 7 is an exemplary flowchart illustrating handling of a request to join a watchdog set in accordance with a preferred embodiment of the present invention.

FIG. 7 is an exemplary flowchart illustrating handling of a request to join a watchdog set in accordance with a preferred embodiment of the present invention. In this example, the operation starts by reading a join FIFO for join requests (step 702). Then a determination is made as to whether or not the join request was received (step 704). If the join request was not received (step 704:NO), the operation returns to step 702 in which the join FIFO are read for join requests. If the join request was received (step 704:YES), a requesting process' state is set to "privileged start" (step 706). A determination is then made as to whether or not only one process is running (step 708). If only one process is running (step 708:YES), a new process is instructed to monitor only the running process (step 710) and thereafter the operation continues to step 716 in which a new process is started as a child. If more than one process is running (step 708:NO), a new process is instructed to monitor the currently running process (step 712). A monitoring process is stopped which is currently being monitored (step 714). Then the new process is started as a child (step 716). A monitoring thread is started to monitor the new process (step 718) and thereafter the operation returns to step 702 in which a join FIFO is read for join requests.

The advantages provided by the present invention should be apparent in view of the detailed description of the invention provided above. The ability to dynamically join and leave the watchdog set and the absence of the requirement of any one process having special significance of acting as an overall monitor over the watchdog set is avoided. Therefore, the present invention provides an advantage that other solutions to the problem of monitoring processes within a set do not address. However, any operating system may be used to implement the operation of the present invention. This product also uses, for example, disk files for storing state and process monitoring information as described above, although any typo of storage device may be used to store the state and process monitoring information, such as, for example, a hard disk, a magnetic tape, and the like. An advantage of the present invention is to ensure a high availability of the processes used to provide, for example, enhanced security to an operating system, such as, for example, a UNIX operating system.

The present invention provides a method in which a process Within a set of processes monitors another process within the set. In addition, each monitoring process is monitored. If a process leaves the set of processes in a normal manner, no further action is taken toward the exiting process. However, monitoring assignments of the processes remaining in the set are reassigned so that all processes are again monitored. However, if a process within the set of processes leaves the set in an abnormal manner, the process which is monitoring the exiting process will attempt to restart the process to bring it back into the set. Furthermore, if a process is not originally in the set, a mechanism is provided for bringing the new process into the set of processes. Once entry into the watchdog set is accomplished by the new process, monitoring assignments are established such that a chosen process within the group begins to monitor the new process and the new process begins monitoring the process formally monitored by the chosen process. "Randomness" occurs in that one of the already running processes reading on the join FIFO will be randomly chosen by an operating system to receive the request to join the watchdog set. Which ever process reads this request will start and monitor the requesting process. Prior to being started, the requesting process will be instructed to monitor whichever process that the process handling the join request was previously monitoring.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include ROM chips or writable-type media such a floppy disc, a hard disk drive, a RAM, and CD-ROMs as well as transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of mutual process monitoring for detecting a termination of a process within a plurality of processes in a data processing system, the method comprising the steps of:

establishing a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system;

responsive to a termination of execution of a monitored process, determining the cause of the execution termination by the monitoring process; and responsive to a determination that the monitored process terminated execution in an abnormal manner, attempting to restart the monitored process by the monitoring process.

2. The method as recited in claim 1, further comprising:

opening a communications link between the monitoring process and the monitored process; and posting a blocking read by the monitoring process in order to detect termination of the monitored process.

3. The method as recited in claim 2, wherein the communications link is a watch FIFO (first-in first-out) communications link.

4. The method as recited in claim 3, wherein posting a blocking read to the watch FIFO communications link is performed in a single thread of execution.

5. The method as recited in claim 2, wherein the monitoring process posts a blocking operation on the communications link that completes the blocking operation on termination of the monitored process.

6. The method as recited in claim 2, wherein the blocking operation is performed in a separate execution thread within the monitoring process in order to allow normal process operation of the monitored process to continue.

7. The method as recited in claim 1, further comprising:

responsive to a determination that the monitored process terminated execution in a normal manner, modifying the monitoring policy, wherein the monitoring policy is modified to assign the monitoring process to monitor a different process within the plurality of processes; and monitoring of the different process by the monitoring process for termination of execution.

8. A method for inserting an additional process within a plurality of processes containing a mutually monitoring process policy in a data processing system, the method comprising the steps of:

establishing a monitoring policy, wherein the monitoring policy assigns each process within the plurality of processes to monitor one other process within the plurality of processes, thereby fanning a ring of mutually monitoring processes within the data processing system, wherein the data processing system is a single node within a multi-node system;

receiving a request for an additional process to join the plurality of processes;

responsive to the additional process joining the plurality of processes, randomly selecting a process within the plurality of processes to monitor the additional process; and modifying the mutually monitoring process policy, wherein the selected process monitors the additional process for termination of execution.

9. The method as recited in claim 8, wherein the additional process monitors the process previously monitored by the selected process.

10. The method as recited in claim 8, wherein the additional process joining the plurality of processes joins as a child of the selected process.

11. The method as recited in claim 8, wherein the request is received by a inter-process communications (IPC) mechanism.

12. The method as recited in claim 8, further comprising:

locking a state file in a join communications link; and blocking any other processes attempting to simultaneously join the plurality of processes.

13. The method as recited in claim 12, wherein the communications link is a first-in first-out communications link.

14. The method as recited in claim 12, wherein blocking any other processes attempting to simultaneously join the plurality of processes is by a file lock.

15. A data processing system for mutual process monitoring for detecting a termination of a process within a plurality of processes in a data processing system, comprising:

establishing means for establishing a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system;

determining means, responsive to a termination of execution of a monitored process, for determining the cause of the execution termination by the monitoring process; and attempting means, responsive to a determination that the monitored process terminated execution in an abnormal manner, for attempting to restart the monitored process by the monitoring process.

16. The data processing system as recited in claim 15, further comprising:

opening means for opening a communications link between the monitoring process and the monitored process; and posting means for posting a blocking read by the monitoring process in order to detect termination of the monitored process.

17. The data processing system as recited in claim 16, wherein the communications link is a watch FIFO (first-in first-out) communications link.

18. The data processing system as recited in claim 17, wherein posting a blocking read to the watch FIFO communications link is performed in a single thread of execution.

19. The data processing system as recited in claim 16, wherein the monitoring process posts a blocking operation on the communications link that completes the blocking operation on termination of the monitored process.

20. The data processing system as recited in claim 16, wherein the blocking operation is performed in a separate execution thread within the monitoring process in order to allow normal process operation of the monitored process to continue.

21. The data processing system as recited in claim 15, further comprising:

modifying means, responsive to a determination that the monitored process terminated execution in a normal manner, for modifying the monitoring policy, wherein the monitoring policy is modified to assign the monitoring process to monitor a different process within the plurality of processes; and monitoring means for monitoring of the different process by the monitoring process for termination of execution.

22. A data processing system for inserting an additional process within a plurality of processes containing a mutually monitoring process policy in a data processing system, the method comprising the steps of:

establishing means for establishing a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system;

receiving means for receiving a request for an additional process to join the plurality of processes;

selecting means, responsive to the additional process joining the plurality of processes, for randomly selecting a process within the plurality of processes to monitor the additional process; and modifying means for modifying the mutually monitoring process policy, wherein the selected process monitors the additional process for termination of execution.

23. The data processing system as recited in claim 22, wherein the additional process monitors the process previously monitored by the selected process.

24. The data processing system as recited in claim 22, wherein the additional process joining the plurality of processes joins as a child of the selected process.

25. The data processing system as recited in claim 22, wherein the request is received by a inter-process communications (IPC) mechanism.

26. The data processing system as recited in claim 22, further comprising:

locking means for locking a file used to join the communications link; and blocking means for blocking any other processes attempting to simultaneously join the plurality of processes.

27. The data processing system as recited in claim 26, wherein the communications link is a FIFO communications link.

28. The data processing system as recited in claim 26, wherein blocking any other processes attempting to simultaneously the plurality of processes is by a file lock.

29. A data processing system, comprising:

a bus system;

a memory, containing a set of instructions and a plurality of processes, connected to the bus system; and a processing unit connected to the bus system, wherein the processing unit executes the set of instructions from the memory to establish a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system, responsive to a termination of execution of a monitored process, the processing unit instructs the monitoring process to determine the cause of the execution termination, and responsive to a determination that the monitored process terminated execution in an abnormal manner, the processing unit instructs the monitoring process to attempt to restart the monitored process.

30. A data processing system, comprising:

a bus system;

a memory, containing a set of instructions and a plurality of processes, connected to the bus system; and a processing unit connected to the bus system, wherein the processing unit executes the set of instructions from the memory to establish a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system, receive a request for an additional process to join the plurality of processes, respond to the additional process joining the plurality of processes, the processing unit randomly selects a process within the plurality of processes to monitor the additional process, and the processing unit instructs the selected process to modify the mutually monitoring process policy, wherein the selected process monitors the additional process for termination of execution.

31. A computer program product in a computer-readable medium for mutual process monitoring for detecting a termination of a process within a plurality of processes in a data processing system, comprising:

instructions for establishing a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system;

instructions, responsive to a termination of execution of monitored process, for determining the cause of the execution termination by the monitoring process; and instructions, responsive to a determination that the monitored process terminated execution in an abnormal manner, for attempting to restart the monitored process by the monitoring process.

32. The computer program product as recited in claim 31, further comprising:

instructions for opening a communications link between the monitoring process and the monitored process; and instructions for posting a blocking read by the monitoring process in order to detect termination of the monitored process.

33. The computer program product as recited in claim 32, wherein the communications link is a watch FIFO communications link.

34. The computer program product as recited in claim 33, wherein the instructions for posting a blocking read to the watch FIFO communications link is performed in a single thread of execution.

35. The computer program product as recited in claim 32, wherein the monitoring process posts a blocking operation on the communications link that completes the blocking operation on termination of the monitored process.

36. The computer program product as recited in claim 32, wherein the blocking operation is performed in a separate execution thread within the monitoring process in order to allow normal process operation of the monitored process to continue.

37. The computer program product as recited in claim 31, further comprising:

instructions, responsive to a determination that the monitored process terminated execution in a normal manner, for modifying the monitoring policy, wherein the monitoring policy is modified to assign the monitoring process to monitor a different process within the plurality of processes; and instructions for monitoring of the different process by the monitoring process for termination of execution.

38. A computer program product in a computer-readable medium for inserting an additional process within a plurality of processes containing a mutually monitoring process policy in a data processing system, comprising:

instructions for establishing a monitoring policy, wherein the monitoring policy assigns each process within the plurality of processes to monitor one other process within the plurality of processes, thereby forming a ring of mutually monitoring processes within the data processing system, wherein the data processing system is a single node within a multi-node system;

instructions for receiving a request for an additional process to join the plurality of processes;

instructions, responsive to the additional process joining the plurality of processes, for randomly selecting a process within the plurality of processes to monitor the additional process; and instructions for modifying the mutually monitoring process policy, wherein the selected process monitors the additional process for termination of execution.

39. The computer program product as recited in claim 38, wherein the additional process monitors the process previously monitored by the selected process.

40. The computer program product as recited in claim 38, wherein the additional process joining the plurality of processes joins as a child of the selected process.

41. The computer program product as recited in claim 38, wherein the request is received by a inter-process communications (IPC) mechanism.

42. The computer program product as recited in claim 38, further comprising:

instructions for locking a state file in a join first-in first-out communications link (FIFO); and instructions for blocking any other processes attempting to simultaneously join the plurality of processes.

43. The computer program product as recited in claim 42, wherein the communications link is a FIFO communications link.

44. The method as recited in claim 42, wherein blocking any other processes attempting to simultaneously join the plurality of processes is by a file lock.

* * * * *